(12) United States Patent
Enami

(10) Patent No.: US 6,476,836 B2
(45) Date of Patent: Nov. 5, 2002

(54) IMAGE FORMING APPARATUS HAVING A FUNCTION OF SAVING DEVELOPING AGENT

(75) Inventor: Eiji Enami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/944,078

(22) Filed: Sep. 4, 2001

(65) Prior Publication Data

US 2002/0027590 A1 Mar. 7, 2002

(30) Foreign Application Priority Data

Sep. 6, 2000 (JP) ........................................ 2000-270148
Aug. 16, 2001 (JP) ........................................ 2001-247323

(51) Int. Cl.⁷ .......................... B41J 2/385; G03G 13/04
(52) U.S. Cl. ........................................ 347/131; 358/448
(58) Field of Search ................................ 347/251, 253, 347/246, 131, 133; 358/448, 298, 459

(56) References Cited

U.S. PATENT DOCUMENTS

| 5,583,621 A | * | 12/1996 | Narukawa | 347/131 |
|---|---|---|---|---|
| 5,724,090 A | * | 3/1998 | Tanaka et al. | 347/131 |
| 5,751,433 A | * | 5/1998 | Narendranath et al. | 347/131 |
| 5,751,434 A | * | 5/1998 | Narendranath et al. | 347/131 |
| 5,959,656 A | * | 9/1999 | Dhong et al. | 347/131 |
| 6,266,153 B1 | * | 7/2001 | Davidson et al. | |
| 2001/0013939 A1 | * | 8/2001 | Weaver et al. | |

FOREIGN PATENT DOCUMENTS

| JP | 7-111588 | | 4/1995 |
|---|---|---|---|
| JP | 7-228005 | | 8/1995 |
| JP | 8-88747 | * | 4/1996 |

* cited by examiner

*Primary Examiner*—Susan S. Y. Lee
(74) *Attorney, Agent, or Firm*—Oblon, Spivak, McClelland, Maier & Neustadt, P.C.

(57) ABSTRACT

Image data is read in through a scanner unit, and, when a toner saving mode is set, the image data having a pixel value larger than a predetermined threshold is converted into a predetermined PWM pattern, while, for the image data having a pixel value not larger than the predetermined threshold, no output is made.

12 Claims, 3 Drawing Sheets

FIG.1A
4 × 4 PIXELS (INPUT)
FIG.1C
4 × 4 PIXELS (OUTPUT)
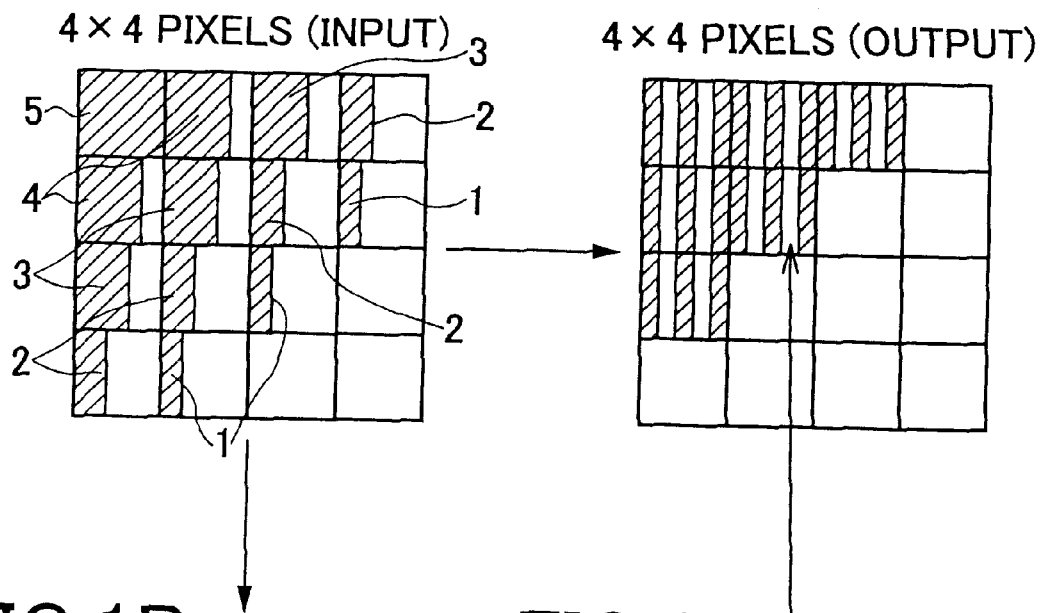
FIG.1B
4 × 4 PIXELS (OUTPUT)
FIG.1D
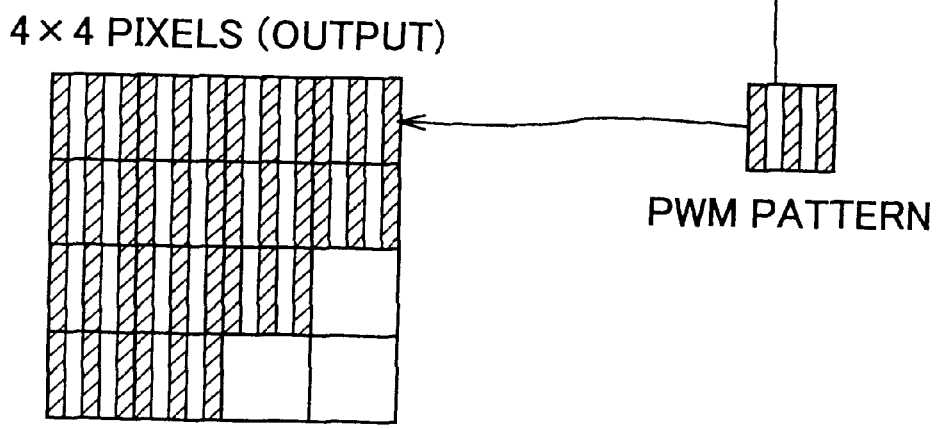
PWM PATTERN

IMAGE FORMING APPARATUS HAVING A FUNCTION OF SAVING DEVELOPING AGENT

BACKGROUND OF THE INVENTION

1. Field of the Invention

The present invention generally relates to an image forming apparatus, and, in particular, to an image forming apparatus which performs control of saving/reducing developing agent by PWM modulation, for example, depending on input image data, output resolution, a mode of image quality, and so forth, so as to effectively save/reduce a consumption of developing agent while maintaining a high image quality.

2. Description of the Related Art

In an image forming apparatus in an electrophotographic type such as a laser printer, a digital copier, a ordinary-paper facsimile apparatus and so forth, various methods of reducing/saving a consumption of developing agent (which will be simply referred to as a toner, hereinafter) such as a toner have been proposed.

For example, Japanese Laid-Open Patent Application No. 7-111588 discloses a method of adjusting the number of pixels printed out in a bitmap form transformed into raster. According to this method, a bit mask having a pattern including active pixels and inactive pixels, and, a logical AND performed between a bitmap transformed into raster and the above-mentioned bit mask is used. Thus, the number of pixels which are printed out is reduced, and, as a result, the amount of toner used (toner consumption) is reduced.

Accordingly, by this method, the bit mask is overlaid on the bitmap, and then, a logical AND therebetween is obtained. Thereby, the number of pixels actually printed out is reduced so that the toner consumption is reduced.

Further, a Japanese Laid-Open Patent Application No. 7-228005 discloses a printing apparatus which prints out data transmitted from a host computer. This apparatus has means for giving instructions of altering a recording density, and recording control means for altering the recording density of each pixel into a predetermined recording density according to the instructions. Thereby, in this printing apparatus, the toner consumption is reduced, and, also, each dot is positively reproduced, by reducing a total interval for which a laser is turned on for each pixel through PWM (pulse width modulation).

However, in the above-mentioned method of Japanese Laid-Open Patent Application No. 7-111588, the density of pixels of a digital image actually printed out is adjusted. Thereby, it is possible to obtain a stable output of black pixels regardless of process conditions, in comparison to a method in which the toner consumption is reduced through reduction in toner thickness. However, as the image data itself is reduced thereby, the image quality is degraded for each dot.

In the above-mentioned apparatus of Japanese Laid-Open Patent Application No. 7-228005, as shown in FIGS. 1A and 1B, each pixel having a pixel value more than 0 is converted into a predetermined uniform PWM pattern, regardless of the specific pixel value. Thereby, even a zone having minute dots scattered as a noise, or a very light tone zone becomes the same as a dark tone zone. Accordingly, even in a mode of toner saving in which an image quality is not important, or a draft mode, an undesirable image may be output. Further, as a light tone zone is converted by using a same PWM pattern as that of a dark tone zone, the toner may be used even more than a case of not employing this conversion.

SUMMARY OF THE INVENTION

An object of the present invention is to provide an image forming apparatus by which, while an image quality is maintained from being degraded much, saving of a developing agent can be effectively achieved.

An image forming apparatus comprises:
an image forming part which forms a visible image based on image data for each pixel by using a developing agent; and
an image converting part which outputs a predetermined developing agent saving pattern for a pixel having a pixel value exceeding a predetermined threshold, but performing no output for a pixel having a pixel value not larger than the predetermined threshold.

Thereby, no output is made for each pixel having a pixel value/image data not larger than the predetermined threshold, and, as a result, no developing agent is made adhere to a photosensitive body for the pixel. Accordingly, it is possible to prevent an excessive output from being made for a minute dot, and, also, to reduce the consumption of the developing agent effectively, while image quality in a thus-formed image is maintained at a still satisfactory level. Further, for each pixel having a pixel value/image data larger than the threshold value, the developing agent saving pattern is output uniformly. Thereby, some dots are thinned out, as shown in FIG. 1D for each pixel, and, thus, the saving of the developing agent is also performed effectively, without much degrading the image quality.

The image forming part may form an electrostatic latent image on a photosensitive body by applying light thereon from a light source based on the image data, and develop the electrostatic latent image by using the developing agent; and
the developing agent saving pattern may comprise a PWM pattern turning on/off the light source several times for one pixel.

Thereby, as mentioned above, as shown in FIG. 1D, some dots are thinned out for each dot according to a predetermined pattern, and, thus, saving of the consumption of the developing agent may be effectively achieved.

The predetermined threshold may be altered in accordance with an image quality of an image to be formed.

Thereby, it is possible to perform appropriate output for a minute dot which is special for each image quality which is set, thus, to appropriately reduce the consumption of the developing agent, while rendering a more satisfactory image quality.

The predetermined threshold may be altered in accordance with a resolution of an image to be formed.

Thereby, it is possible that no output is made selectively for a light tone zone of an image for which output is otherwise made at a relatively dark tone when a low resolution is set, and, thus, it is possible to appropriately reduce the consumption of the developing agent, while rendering a more satisfactory image quality.

The image forming apparatus may further include a setting part by which a developing agent saving function is set on/off, and
wherein the image data converting part functions only when the developing agent saving function is set on, but, otherwise, conversion of image data is not performed by the image data converting part.

Thereby, according to a request of a user, a high-quality image may be output, or saving of the consumption of the developing agent may be performed effectively.

The developing agent saving function may be made to be set off as a result of the above-mentioned predetermined threshold being set to be "0".

Thereby, it is possible to omit a special circuit for controlling on/off of the developing agent saving function, thus, to provide an inexpensive image forming apparatus by which the consumption of the developing agent can be performed effectively.

Other objects and further features of the present invention will become more apparent from the following detailed description when read in conjunction with the accompanying drawings.

BRIEF DESCRIPTION OF THE DRAWINGS

FIG. 1A shows an example of input image data (4×4 pixels); FIG. 1B shows an example of image data after the image data of FIG. 1A undergoes toner saving processing according to one example of the related art; FIG. 1C shows an example of image data after the image data of FIG. 1A undergoes toner saving processing according to one embodiment of the present invention; and FIG. 1D illustrates one example of a PWM pattern used in the toner saving processing;

DETAILED DESCRIPTION OF THE PREFERRED EMBODIMENT

A preferred embodiment of the present invention will now be described with reference to the figures. However, as the embodiment is a preferred one, various limitations are included therein which are preferable in view of technical reasons. However, a scope of the present invention is not limited thereto unless any limitation of the present invention is particularly specified in the description below.

Figure 2:
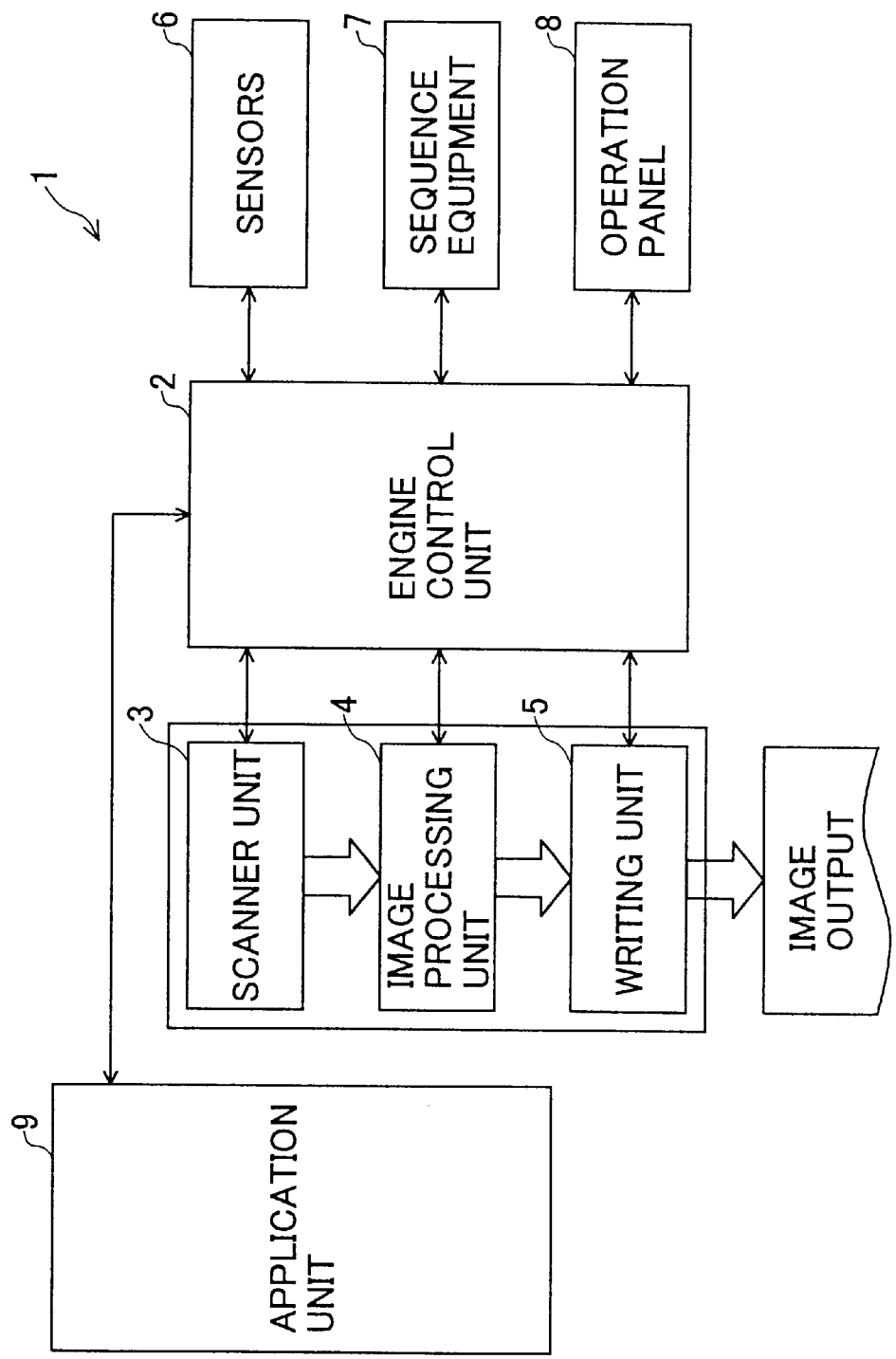
FIG. 2 is a block diagram showing essential parts of a digital copier in the embodiment of the present invention.

FIGS. 1A, 1C, 1D, 2 and 3 illustrate the embodiment of the present invention. FIG. 2 shows a general block diagram of a digital copier 1 in the embodiment of the present invention.

In FIG. 2, the digital copier 1 includes an engine control unit 2, a scanner unit 3, an image processing unit 4, a writing unit 5, various sensors 6, a sequence equipment 7, an operation panel 8 and so forth. In this configuration, not only image formation is performed based on image data read and taken in through the scanner unit 3, but also image formation is performed based on image data from an application unit 9 such as another scanner device, a printer or a facsimile apparatus.

The various sensors 6 include a recording-paper sensor, a toner sensor, a fixing-temperature sensor and so forth, and output detection results to the engine control unit 2.

The sequence equipment 7 includes various sequence units needed for performing image formation by an electrophotographic process, and thus includes a paper-feeding unit, a electrically-charging unit, a developing unit, a transfer unit, a fixing unit and so forth.

The operation panel 8 has various operation keys such as a start key, a stop key, and so forth needed for operating the digital copier 1, and a display device such as a liquid crystal display device. By the respective keys, various operations for operating the digital copier 1 are performed, and, on a display device, contents of instructions input through the respective keys, and various kinds of information for reporting to an operator from the digital copier 1 are displayed. On the operation panel 8, a setting key for turning on/turning off a toner saving control function, that is, to turning on/off a toner saving mode, which will be described later, is provided.

The scanner unit 3 applies light from a light source to an original which is set there, performs main scanning and sub-scanning of the original, converts reflected light from the original into an electric signal, thus reads an image of the original, and outputs thus-obtained image data of the original to the image processing unit 4.

The image processing unit 4 performs image adjustment, size-change operation, and/or the like on image data provided by the scanner unit 3 or the above-mentioned application unit 9, and, sends the thus-processed data to the writing unit 5. Also, the image processing unit 4 performs the toner saving control processing (processing of reducing the consumption of the developing agent) by PWM (pulse width modulation) at the last stage thereof.

Specifically, the image processing unit 4 outputs a PWM pattern (referred to as a toner saving PWM pattern, hereinafter) for toner saving control for an input pixel value (input from the scanner unit 3 or application unit 9) exceeding a predetermined threshold value, while outputting the pixel value "0" for the input pixel value not exceeding the predetermined threshold value. Then, these outputs are sent to the writing unit 5 as toner saving image data. For example, when the input pixel value (FIG. 1A shows a pixel value of each pixel) exceeds "2" (predetermined threshold value), the toner saving PWM pattern (pulse width modulation pattern for saving the developing agent) such as that shown in FIG. 1D is output therefor uniformly for the pixel. As a result, the toner saving image data such as that shown in FIG. 1C is obtained in which each pixel has a plurality of dots combined therein. In the figures, hatched parts represent black dots, for example (in a case where a black toner is used as the developing agent).

For the toner saving PWM pattern, various kinds of patterns are previously stored in a memory of the image processing unit 4 to be selected therefrom depending on a required toner saving rate and/or image quality. Then, an appropriate PWM pattern of them may be specified directly, or indirectly through reference data obtained from referring to a predetermined look-up table through which an appropriate toner saving PWM pattern can be specified.

The writing unit 5 turns on/off a laser diode (light source) according to image data sent from the image processing unit 4, regardless of whether or not the toner saving function is set in the digital copier 1, and thus, performs optical writing on a photosensitive body (latent image carrying body). When the image data is of the above-mentioned toner saving PWM pattern, the writing unit 5 performs PWM (pulse width modulation) processing such as to turning on/off the laser diode several times for one pixel according to the PWM pattern.

Then, the engine control unit 2 drives the above-mentioned sequence equipment 7 including the paper-feeding unit, electricity-charging unit, developing unit, transfer unit, fixing unit and so forth in synchronization with the operation of the writing unit 5, and, thus, forms an image on a recording paper.

At this occasion, when the toner saving function is executed in PWM on image data sent to the writing unit 5, that is, the image data is the toner saving image data, as black dots of each pixel are thinned out by the predetermined pattern, image output can be made such that the toner consumption is reduced according to the PWM pattern used, while degradation in image quality is little.

Operation of the above-described embodiment of the present invention will now be described. In the digital copier 1 in the embodiment of the present invention, when this apparatus is in the toner saving mode, and, also, image data has a pixel value exceeding the predetermined threshold, the toner saving PWM pattern is output for the pixel. Thus, the toner consumption is effectively reduced.

Specifically, when copying instructions are given through the operation panel 8 by an operator, the scanner unit 3 reads an image of an original, and transfers thus-obtained image data to the image processing unit 4. Further, when facsimile output or printer output instructions are given by the mounted application, image data is sent to the image processing unit 4 from the relevant application unit 9.

The image processing unit 4 performs image-quality control and/or size-change control on the image data as the necessity arises, and, then, sends the thus-processed image data to the writing unit 5, which then drives the laser diode according to the thus-received image data, and performs optical writing on the photosensitive body. These operations are controlled by the engine control unit 2 based on inputs from the respective sensors 6, and, also, the sequence equipment 7 such as the photosensitive body, fixing unit and so forth are controlled by the engine control unit 2. Thereby, an toner image (visible image) is formed on a recording paper.

Figure 3:
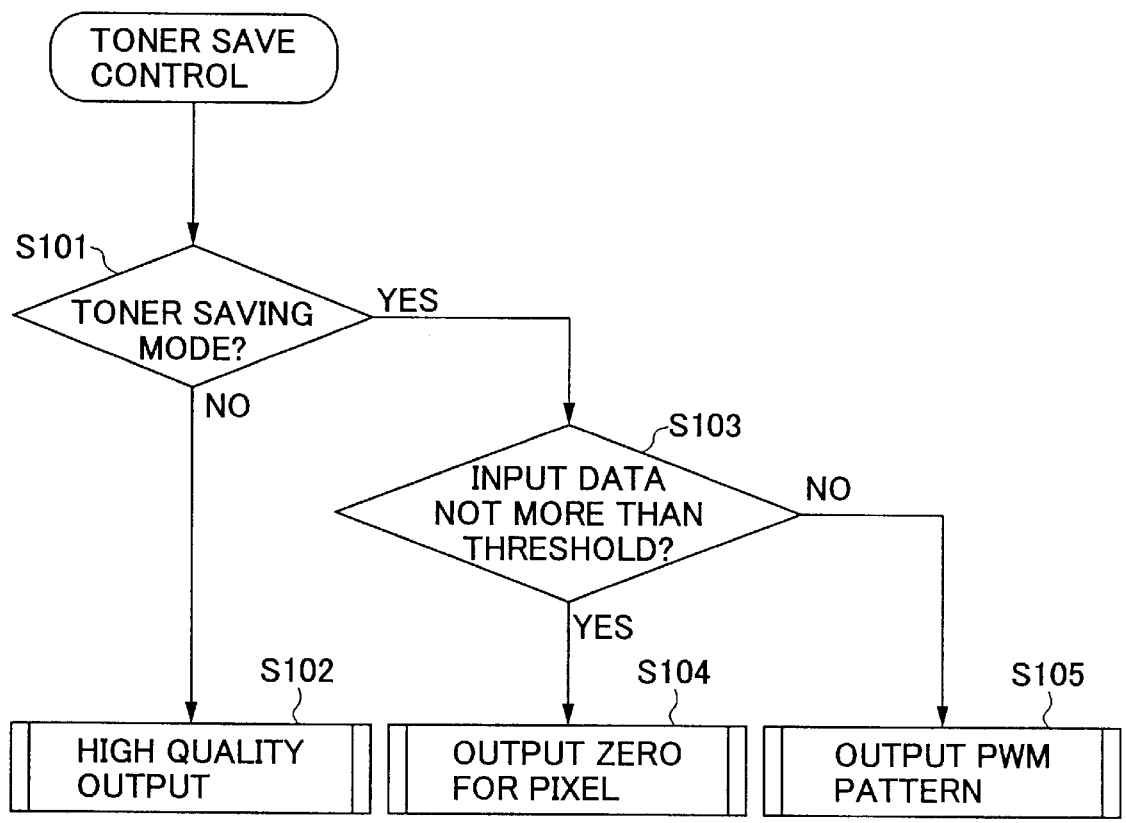
FIG. 3 shows an operation flow chart of the toner saving processing performed by the digital copier shown in FIG. 2.

Then, the engine control unit 2 controls the above-described operations, and, also, as shown in FIG. 3, determines whether or not the toner saving mode is set (in a step S101), and, when the toner saving mode is not set (NO of S101), the above-described toner saving operation is not performed, and, the input image data is transferred, as it is, to the writing unit 5, and, thus, image output is performed at a high image quality. The setting of the toner saving mode may be made by an operator through an appropriate key on the operation panel 8, or may be set by the engine control unit 2 itself through determination based on various conditions.

When the toner saving mode is set (YES in the step S101), the engine control unit 2 compares input image data with. the predetermined threshold value, and determines whether or not the input image data is not larger than the threshold value (in a step S103). Then, when the input image data is not larger than the threshold value, the output of the relevant pixel is made off. This predetermined threshold value may be variable in accordance with a set image quality, or output resolution, or may be a predetermined fixed value.

In the step S103, when the input image data is larger than the above-mentioned threshold value, the image processing unit 4 outputs the toner saving PWM pattern for the input pixel data, as shown in FIG. 1C, and is sent to the writing unit 5 (in a step S105). For the toner save PWM pattern, as described above, the various patterns are previously stored in the memory of the image processing unit 4 to be selected depending on required toner saving rate, and/or image quality, and, an appropriate PWM pattern thereof may be directly specified, or may be specified indirectly through reference data obtained by referring to the predetermined look-up table through which an appropriate PWM pattern can be specified.

Then, the writing unit 5 turns on/off the laser diode in accordance with the transferred image data, regardless of whether or not the toner saving mode is set, performs optical writing onto the photosensitive body, or, when the image data is of the toner saving PWM pattern, the writing unit 5 performs the PWM (pulse width modulation) processing such as to turn on/off the laser diode several times for one pixel in accordance with the PWM pattern, and performs optical writing onto the photosensitive body accordingly.

Thus, when the PWM processing is performed, black dots of the image data are thinned out according to the predetermined pattern for each pixel, and, image output is performed such that the toner consumption is reduced in accordance with the used PWM pattern, and, thus, a toner saved output is obtained while degradation in image quality is little.

The above-mentioned processing of reducing the toner consumption by using the toner savings PWM pattern based on determination as to whether or not image data exceeds the predetermined threshold value may be made invalid through instructions given by an operator through the operation panel 8.

Thus, according to the digital copier 1 in the embodiment of the present invention, light is applied to the photosensitive body through pulse width modulation processing such as to turn on/off the laser light source several times for one pixel based on image data developed into a bitmap form, an electrostatic latent image is formed on the photosensitive body, and the electrostatic latent image is then developed by using the toner. In this configuration, when the image data exceeds the predetermined threshold value, the PWM pattern is output for the relevant pixel, and, thus, the toner consumption is reduced. When the image data is not larger than the predetermined threshold value, the output of the relevant pixel is made off. Thus, the toner saving processing is performed.

Thus, for the pixel having the image data not larger than the predetermined threshold value, no output is made, that is, no toner is made adhere to the photosensitive body. Thereby, it is possible to prevent excess output from being made for a minute dot, and, also, to reduce the toner consumption. Accordingly, the thus-formed image can have a satisfactory image quality, and, also, the toner consumption can be reduced simultaneously.

Further, in the digital copier 1 in the embodiment of the present invention, it is possible to configure it so that the threshold value used for comparison with the input image data is altered according to an image quality of an image to be formed. Thereby, it is possible to perform appropriate output for a minute dot special to each image quality to be set, and, thus, it is possible to perform reduction of toner consumption appropriately, and, also, to obtain a more satisfactory image quality.

Furthermore, in the digital copier 1 in the embodiment of the present invention, it is possible to configure it so that the threshold value used for comparison with the input image data is altered according to a resolution of an image to be formed. Thereby, it is possible that no output is made selectively for a light tone zone which is otherwise output to have a dark tone level when a low resolution is set. Accordingly, it is possible to reduce the toner consumption appropriately, while having a more satisfactory image quality.

Further, in the digital copier 1 in the embodiment of the present invention, the toner saving processing is performed only when the toner saving function is set on. Accordingly, it is possible to enable image formation at a high quality when the toner saving function is set off, while the toner consumption can be reduced when the toner saving function is set on, according to a request of user.

Further, it is possible to configure it so that, when the above-mentioned threshold value is set to be "0", the toner saving processing is automatically made off. Thereby, it is possible to omit a special circuit for controlling turning on/off the toner saving function. Thereby, it-is possible to selectively enable image formation at a high quality or to reduce the toner consumption according to a request of a user at a low cost.

Further, in the above-described embodiment, the present invention is applied to the digital copier 1. However, it is also possible to similarly apply the present invention to a laser printer, an ordinary-paper facsimile apparatus or the like in which an image is developed into a bitmap form, and is output accordingly.

Further, the present invention is not limited to the above-described embodiment, and variations and modifications may be made without departing from the scope of the present invention.

The present application is based on Japanese priority applications nos. 2000-270148, and 2001-247323, filed on Sep. 6, 2000, and Aug. 16, 2001, respectively, the entire contents of which are hereby incorporated by reference.

What is claimed is:

1. An image forming apparatus comprising:
   an image forming part which forms a visible image based on image data for each pixel by using a developing agent; and
   an image converting part which outputs a predetermined developing agent saving pattern for a pixel having a pixel value exceeding a predetermined threshold, but performing no output for a pixel having a pixel value not larger than the predetermined threshold.

2. The image forming apparatus as claimed in claim 1, wherein:
   said image forming part forms an electrostatic latent image on a photosensitive body by applying light from a light source based on the image data, and develops the electrostatic latent image by using the developing agent; and
   the developing agent saving pattern comprises a PWM pattern for turning on/off the light source several times for one pixel.

3. The image forming apparatus as claimed in claim 1, wherein said predetermined threshold is altered in accordance with an image quality of an image to be formed.

4. The image forming apparatus as claimed in claim 1, wherein said predetermined threshold is altered in accordance with a resolution of an image to be formed.

5. The image forming apparatus as claimed in claim 1, further comprising a setting part by which a developing agent saving function is set on/off,
   wherein said image converting part functions only when the developing agent saving function is set on, but, otherwise, conversion of image data is not performed by said image converting part.

6. The image forming apparatus as claimed in claim 1, wherein a developing agent saving function is set off as a result of the predetermined threshold being set to be "0".

7. An image forming apparatus comprising:
   image forming means (7) for forming a visible image based on image data for each pixel by using a developing agent; and
   image converting means (4) for outputting a predetermined developing agent saving pattern for a pixel having a pixel value exceeding a predetermined threshold, but performing no output for a pixel having a pixel value not larger than the predetermined threshold.

8. The image forming apparatus as claimed in claim 7, wherein:
   said image forming means forms an electrostatic latent image on a photosensitive body by applying light from a light source based on the image data, and develops the electrostatic latent image by using the developing agent; and
   the developing agent saving pattern comprises a PWM pattern for turning on/off the light source several times for one pixel.

9. The image forming apparatus as claimed in claim 7, wherein said predetermined threshold is altered in accordance with an image quality of an image to be formed.

10. The image forming apparatus as claimed in claim 7, wherein said predetermined threshold is altered in accordance with a resolution of an image to be formed.

11. The image forming apparatus as claimed in claim 7, further comprising setting means for setting on/off a developing agent saving function, and
    wherein said image converting means functions only when the developing agent saving function is set on, but, otherwise, conversion of image data is not performed by said image converting means.

12. The image forming apparatus as claimed in claim 7, wherein a developing agent saving function is set off as a result of the predetermined threshold being set to be "0".

* * * * *